(12) United States Patent
Mori

(10) Patent No.: US 9,016,329 B2
(45) Date of Patent: Apr. 28, 2015

(54) GAS FILLING SYSTEM, GAS FILLING METHOD, AND VEHICLE

(75) Inventor: Tomoyuki Mori, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 515 days.

(21) Appl. No.: 13/510,059

(22) PCT Filed: Oct. 28, 2010

(86) PCT No.: PCT/IB2010/002746
§ 371 (c)(1), (2), (4) Date: May 16, 2012

(87) PCT Pub. No.: WO2011/061584
PCT Pub. Date: May 26, 2011

(65) Prior Publication Data
US 2012/0227864 A1 Sep. 13, 2012

(30) Foreign Application Priority Data
Nov. 18, 2009 (JP) .................. 2009-262794

(51) Int. Cl.
*B65B 3/04* (2006.01)
*F17C 5/06* (2006.01)

(52) U.S. Cl.
CPC ............ *F17C 5/06* (2013.01); *F17C 2201/056* (2013.01); *F17C 2201/058* (2013.01); *F17C 2203/0604* (2013.01); *F17C 2203/0646* (2013.01); *F17C 2203/0658* (2013.01); *F17C 2205/0134* (2013.01); *F17C 2205/0326* (2013.01); *F17C 2205/037* (2013.01); *F17C 2221/012* (2013.01); *F17C 2223/0123* (2013.01);
(Continued)

(58) Field of Classification Search
USPC .................. 141/2, 4, 82, 83, 94, 95, 192, 197
See application file for complete search history.

(56) References Cited

U.S. PATENT DOCUMENTS 5,570,729 A 11/1996 Mutter
5,628,349 A 5/1997 Diggins et al.
(Continued)

FOREIGN PATENT DOCUMENTS

CN 102282410 12/2011
DE 197 05 601 A1 8/1998
(Continued)

OTHER PUBLICATIONS

Office Action for U.S. Appl. No. 13/387,665 mailed Sep. 10, 2013.
(Continued)

*Primary Examiner* — Timothy L Maust
*Assistant Examiner* — Timothy P Kelly
(74) *Attorney, Agent, or Firm* — Finnegan, Henderson, Farabow, Garrett & Dunner, LLP

(57) ABSTRACT

A gas filling system (1) includes a gas tank (30); a gas filling device (2) that fills gas into the gas tank (30); and a controller (24) that calculates a temperature increase $\Delta T$ and a pressure increase $\Delta P$ in the gas tank (30) during a predetermined period of time (t seconds) that elapses from a start of gas filling. The controller (24) selects a filling rate map (Ma, Mb) from a prepared filling rate map group on the basis of the calculated temperature increase $\Delta T$ and the calculated pressure increase $\Delta P$. The gas filling device (2) carries out gas filling using the filling rate map selected by the controller (24).

23 Claims, 7 Drawing Sheets

(52) U.S. Cl.
CPC .. *F17C 2223/035* (2013.01); *F17C 2225/0123* (2013.01); *F17C 2225/035* (2013.01); *F17C 2227/0157* (2013.01); *F17C 2227/0341* (2013.01); *F17C 2227/039* (2013.01); *F17C 2250/032* (2013.01); *F17C 2250/034* (2013.01); *F17C 2250/043* (2013.01); *F17C 2250/0439* (2013.01); *F17C 2250/0443* (2013.01); *F17C 2250/0491* (2013.01); *F17C 2250/0495* (2013.01); *F17C 2250/0636* (2013.01); *F17C 2250/0694* (2013.01); *F17C 2260/025* (2013.01); *F17C 2260/026* (2013.01); *F17C 2265/065* (2013.01); *F17C 2270/0105* (2013.01); *F17C 2270/0168* (2013.01); *F17C 2270/0184* (2013.01); *F17C 2270/0189* (2013.01); *F17C 2270/05* (2013.01); *Y02E 60/321* (2013.01); *Y02E 60/324* (2013.01)

(56) References Cited

U.S. PATENT DOCUMENTS

| | | | |
|---|---|---|---|
| 5,810,058 | A | 9/1998 | Kountz et al. |
| 5,868,176 | A | 2/1999 | Barajas et al. |
| 6,598,624 | B2 | 7/2003 | Togasawa et al. |
| 6,619,336 | B2 * | 9/2003 | Cohen et al. .......... 141/83 |
| 6,672,340 | B2 | 1/2004 | Mutter |
| 7,059,364 | B2 | 6/2006 | Kountz et al. |
| 7,325,561 | B2 | 2/2008 | Mathison et al. |
| 7,896,036 | B2 * | 3/2011 | Kobayashi et al. .......... 141/94 |
| 8,020,589 | B2 | 9/2011 | Cohen et al. |
| 8,365,777 | B2 * | 2/2013 | Farese et al. .......... 141/4 |
| 8,708,005 | B2 * | 4/2014 | Mori .......... 141/197 |
| 2002/0014277 | A1 | 2/2002 | Togasawa et al. |
| 2002/0053365 | A1 | 5/2002 | Mutter |
| 2005/0178463 | A1 | 8/2005 | Kountz et al. |
| 2005/0247123 | A1 | 11/2005 | Fuse |
| 2007/0186982 | A1 | 8/2007 | Cohen et al. |
| 2007/0257043 | A1 | 11/2007 | Kanoya et al. |
| 2008/0035235 | A1 | 2/2008 | Kobayashi et al. |
| 2009/0205745 | A1 | 8/2009 | Farese et al. |
| 2010/0276031 | A1 | 11/2010 | Saiki et al. |
| 2010/0294393 | A1 | 11/2010 | Allidieres et al. |
| 2010/0307636 | A1 | 12/2010 | Uemura |
| 2012/0000574 | A1 | 1/2012 | Nishiumi |
| 2012/0111447 | A1 | 5/2012 | Mori et al. |
| 2012/0125480 | A1 | 5/2012 | Inagi et al. |
| 2012/0125482 | A1 | 5/2012 | Mori |
| 2012/0205003 | A1 | 8/2012 | Okawachi |
| 2012/0227864 | A1 | 9/2012 | Mori |
| 2012/0267002 | A1 | 10/2012 | Kittilsen et al. |

FOREIGN PATENT DOCUMENTS

| | | |
|---|---|---|
| DE | 10 2005 033 854 | 1/2007 |
| DE | 20 2007 008 748 | 9/2007 |
| DE | 11 2010 003 1 | 3/2013 |
| EP | 1 205 704 | 5/2002 |
| EP | 1 291 575 | 3/2003 |
| EP | 1 291574 | 3/2003 |
| EP | 2 093 475 A1 | 8/2009 |
| JP | 2001-355795 | 12/2001 |
| JP | 2002-115796 | 4/2002 |
| JP | 2004-28211 | 1/2004 |
| JP | 2005-69327 | 3/2005 |
| JP | 2005-127430 | 5/2005 |
| JP | 2006-226511 | 8/2006 |
| JP | 2007-147005 | 6/2007 |
| JP | 2008-281108 | 11/2008 |
| WO | WO 2009/034283 | 3/2009 |

OTHER PUBLICATIONS

Office Action for U.S. Appl. No. 13/387,665 mailed Nov. 21, 2012.
Notice of Allowance for U.S. Appl. No. 13/387,665 mailed Dec. 27, 2013.
International Search Report in International Application No. PCT/IB2010/002746; Mailing Date: Feb. 4, 2011.
Written Opinion of the International Searching Authority in International Application No. PCT/IB2010/002746; Mailing Date: Feb. 4, 2011.
Applicant's Response to Written Opinion in International Application No. PCT/IB2010/002746 (Sep. 8, 2011).
Applicant's Response to Invitation in International Application No. PCT/IB2010/002746 (Dec. 28, 2011).
"Kennlinie; in: Wikipedia," Die freie Enzyklopädie; Bearbeitungsstand: Sep. 29, 2009, 18:32 UTC. URL: http://de.wikipedia.org/w/index.php?title=Kennlinie&oldid=65048808.
"Steuergerät; in:Wikipedia," Die freie Enzyklopädie; Bearbeitungsstand: 5 Okt. 2009, 01:42 UTC. URL: http://de.wikipedia.org/w/index.php?title=Steuerger%C3%A4t&oldid=65235219.

* cited by examiner

FIG.5

| | | OPTIMAL FILLING RATE MAP | | |
|---|---|---|---|---|
| TANK INITIAL PRESSURE [MPa] | | $\frac{\Delta T}{\Delta P} < A$ | $A \le \frac{\Delta T}{\Delta P} \le B$ | $\frac{\Delta T}{\Delta P} > B$ |
| | 2~20 | Ma | Mb | Mc |
| | 20~50 | Md | Me | Mf |
| | 50~87.5 | Mg | Mh | Mi |

MM

GAS FILLING SYSTEM, GAS FILLING METHOD, AND VEHICLE

CROSS-REFERENCE TO RELATED APPLICATIONS

This application is a national phase application of International Application No. PCT/IB2010/002746, filed Oct. 28, 2010, and claims the priority of Japanese Application No. 2009-262794, filed Nov. 18, 2009, the contents of both of which are incorporated herein by reference.

BACKGROUND OF THE INVENTION

1. Field of the Invention

The invention relates to a gas filling system that fills a gas tank mounted on, for example, a vehicle with gas from a gas filling device installed in, for example, a hydrogen station.

2. Description of the Related Art

A vehicle equipped with a gas tank makes a stop at a gas station for gas filling, and gas is filled into the gas tank from a filling nozzle of a gas filling device. In the case of hydrogen gas, the temperature and pressure increase in the gas tank as the hydrogen gas is filled into the gas tank, so it is necessary to regulate the filling amount so that these temperature and pressure do not exceed respective reference values. In terms of this point, Japanese Patent Application Publication No. 2007-147005 (JP-A-2007-147005) describes a technique that the temperature in a hydrogen tank is measured during hydrogen filling and then a filling path is changed to a filling path with a precooler when the temperature is higher than a predetermined value to thereby suppress an increase in temperature and ensure a sufficient filling amount.

Incidentally, the degree of increase in temperature in a gas tank during filling significantly varies depending on the heat radiation property of the gas tank. A gas tank that has an excellent heat radiation property allows a filling rate (filling flow rate) to be increased, and, by so doing, a period of time for filling may be reduced. However, the technique described in JP-A-2007-147005, the heat radiation property of a gas tank and a period of time for filling are not considered, so there is still room for improvement. In addition, Japanese Patent Application Publication No. 2005-127430 (JP-A-2005-127430) describes a method in which a maximum filling rate corresponding to the shape and capacity of a gas tank is prestored in a database at a gas station and then the maximum filling rate is loaded during filling. According to this method, it is necessary to update the database each time a new gas tank is developed, so it is realistically difficult.

SUMMARY OF INVENTION

The invention provides a gas filling system, gas filling method and vehicle, which are able to fill gas at a filling rate appropriate for a gas tank even when the characteristic of an individual gas tank is not acquired in advance.

A first aspect of the invention relates to a gas filling system. The gas filling system includes: a gas tank; a gas filling device that fills gas into the gas tank; and a controller that calculates a temperature increase and a pressure increase in the gas tank during a predetermined period of time that elapses from a start of gas filling, and that selects a filling rate map from a prepared filling rate map group on the basis of the calculated temperature increase and the calculated pressure increase. The gas filling device includes an operation control unit that uses the filling rate map, selected by the controller, to carry out gas filling.

In addition, a second aspect of the invention relates to a gas filling method for filling gas from a gas filling device into a gas tank. The method includes: starting gas filling by the gas filling device; calculating a temperature increase and a pressure increase in the gas tank during a predetermined period of time that elapses from the start of gas filling; selecting a filling rate map from a prepared filling rate map group on the basis of the calculated temperature increase and the calculated pressure increase, and carrying out gas filling by the gas filling device using the selected filling rate map.

According to the aspects of the invention, the heat radiation performance of the gas tank may be acquired from a temperature increase and a pressure increase, and a filling rate map is selected on the basis of the acquired heat radiation performance. Thus, it is possible to carry out gas filling at a filling rate suitable for the gas tank. By so doing, a predetermined filling amount (a filling amount in the case of full filling and a filling amount in the case of specified amount filling) may be filled in a short period of time as much as possible while the inside of the gas tank is kept stable. In addition, the heat radiation performance of the gas tank is acquired from a calculated temperature increase and a calculated pressure increase, so it is not necessary to store the heat radiation performance of each of the individual gas tanks in advance or it is not necessary to update a filling rate map group for each gas tank. Furthermore, because both a temperature increase and a pressure increase are calculated, the heat radiation performance may be acquired irrespective of the volume of the gas tank.

The operation control unit may carry out gas filling at a constant filling rate during the predetermined period of time that elapses from the start of gas filling. By so doing, the filling rate map group may be simplified. In this case, a constant filling rate is desirably lower than a filling rate defined in the filling rate map. By so doing, in the process of acquiring the heat radiation performance of the gas tank, it is possible to reliably prevent the state in the gas tank from exceeding a reference value.

The controller may select the filling rate map on the basis of a ratio of the calculated temperature increase to the calculated pressure increase. By so doing, for example, in comparison with a filling rate map that defines a pressure increase and a temperature increase by a predetermined range, the filling rate map may be simplified.

The filling rate map group may configure individual filling rate maps so that a filling rate increases as the ratio decreases. By so doing, for example, when the temperature increase is small, a predetermined filling amount may be filled in a short period of time as compared with when the temperature increase is large.

The gas filling device may have a gas supply source and a cooler that is provided between the gas supply source and the gas tank and that cools gas from the gas supply source. Then, the controller may select the filling rate map on the basis of the calculated temperature increase, the calculated pressure increase and a temperature of gas cooled by the cooler. With the above configuration, gas filling in consideration of cooling performance of the cooler is possible.

Similarly, the gas filling system may further include an outside air temperature sensor, and the controller may select the filling rate map on the basis of the calculated temperature increase, the calculated pressure increase and the outside air temperature detected by the outside air temperature sensor or on the basis of the calculated temperature increase, the calculated pressure increase, a temperature of gas cooled by the cooler and the outside air temperature.

The gas filling system may further include a display that indicates a fact that gas is being filled or has been filled into the gas tank using the filling rate map selected by the controller. With the above configuration, a gas filling worker can visually recognize the fact that gas filling suitable for the heat radiation performance of the gas tank is being carried out or has been carried out.

The gas tank may be mounted on a vehicle, the controller may be provided for the gas filling device, the gas filling system may further include a communication device that transmits information about a temperature and a pressure in the gas tank, acquired at a side of the vehicle, to the controller at a side of the gas filling device through communication. With the above configuration, communication may be carried out between the vehicle and the gas filling device, so it is not necessary to manually input the information, acquired at the side of the vehicle, to the side of the gas filling device. In addition, after receiving the information acquired at the side of the vehicle, gas filling may be carried out mainly at the side of the gas filling device.

The gas filling system may further include a storage device that stores a history of communication carried out by the communication device. With the above configuration, for example, by checking the history of communication at the time of vehicle inspection, it is possible to determine whether gas filling has been carried out using the filling rate map suitable for the heat radiation performance of the gas tank.

The vehicle according to the aspects of the invention may be used for the gas filling system. The vehicle may include a temperature sensor and a pressure sensor that acquire information about a temperature and a pressure in the gas tank and a communication instrument, as part of the communication device, that transmits the information, acquired by the temperature sensor and the pressure sensor, to a communication instrument at the side of the gas filling device.

A third aspect of the invention relates to a gas filling device that fills gas into a gas tank. The gas filling device includes: an acquisition device that acquires a temperature and a pressure in the gas tank; a controller that calculates a temperature increase and a pressure increase in the gas tank during a predetermined period of time that elapses from a start of filling gas to the gas tank, and that selects a filling rate map from a prepared filling rate map group on the basis of the calculated temperature increase and the calculated pressure increase; and an operation control unit that carries out gas filling using the filling rate map selected by the controller.

BRIEF DESCRIPTION OF DRAWINGS

The features, advantages, and technical and industrial significance of this invention will be described below with reference to the accompanying drawings, in which like numerals denote like elements, and wherein:

FIG. 5 is a view that shows an example of a filling rate map group used for the flow of gas filling according to the first alternative embodiment;

DETAILED DESCRIPTION OF EMBODIMENTS

An embodiment in which hydrogen gas is filled from a gas filling device to a fuel cell vehicle equipped with a fuel cell system will be described as a gas filling system and a gas filling method. Note that, as is generally known, the fuel cell system includes a fuel cell, or the like, that generates electricity by the electrochemical reaction between fuel gas (for example, hydrogen gas) and oxidant gas (for example, air).

Figure 1:
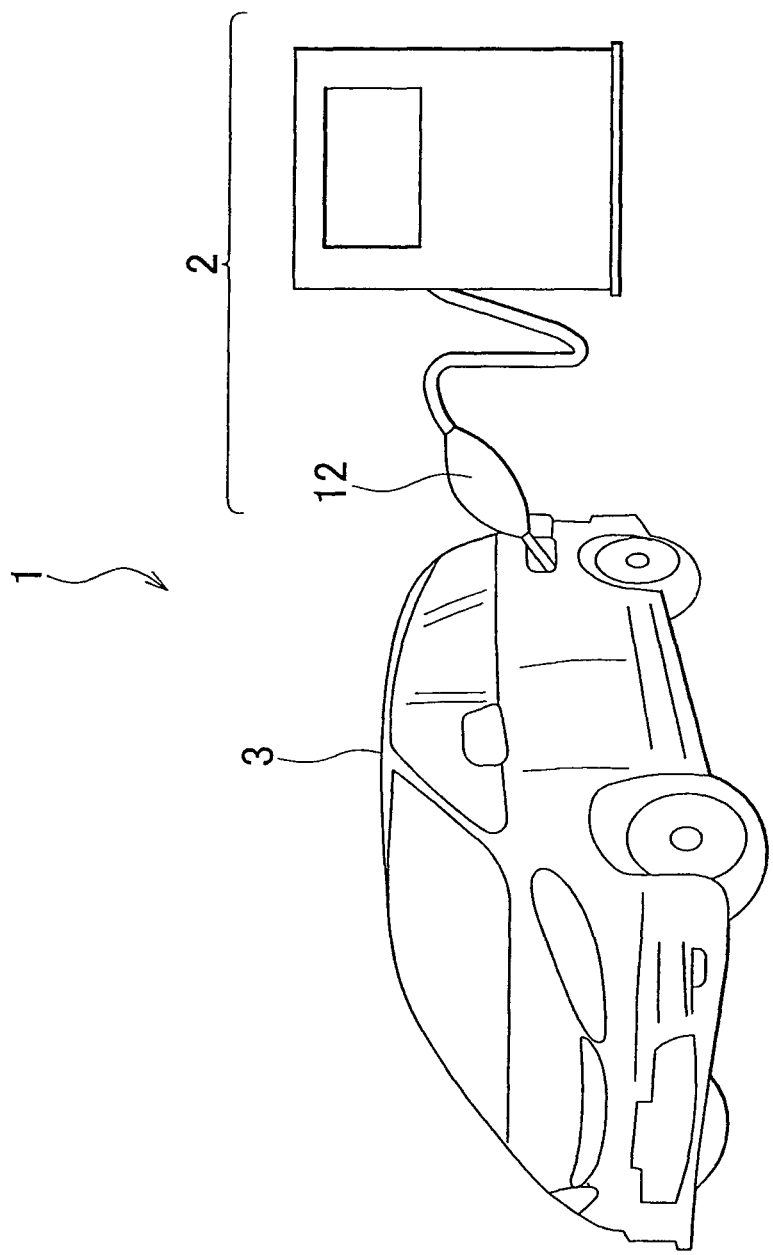
FIG. 1 is a schematic diagram of a gas filling system according to an embodiment.

As shown in FIG. 1, a gas filling system 1, for example, includes a gas filling device 2 and a vehicle 3. The gas filling device 2 is installed in, for example, a hydrogen station, or the like. The vehicle 3 is supplied with hydrogen gas from the gas filling device 2.

Figure 2:
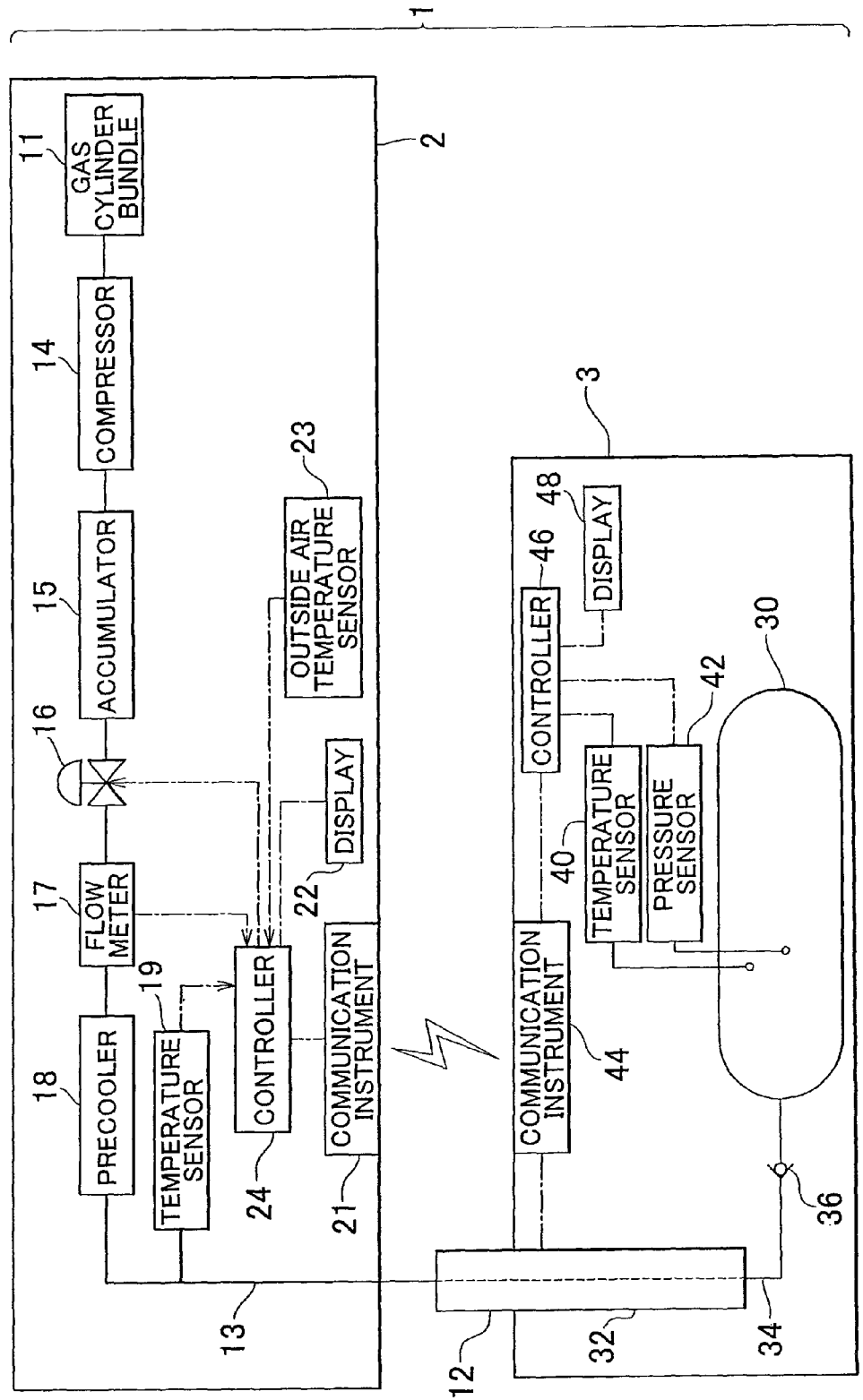
FIG. 2 is a configuration diagram of the gas filling system according to the embodiment.

As shown in FIG. 2, the gas filling device 2 includes a gas cylinder bundle (gas supply source) 11, a filling nozzle 12 and a gas flow channel 13. The gas cylinder bundle 11 stores hydrogen gas. The filling nozzle 12 discharges hydrogen gas toward a vehicle-mounted gas tank 30. The gas flow channel 13 connects the gas cylinder bundle 11 with the filling nozzle 12. The filling nozzle 12 is a component termed a filling coupling. The filling nozzle 12 is connected to a receptacle 32 of the vehicle 3 for filling hydrogen gas. The filling nozzle 12 and the receptacle 32 constitute a connecting unit that connects the gas filling device 2 with the gas tank 32.

A compressor 14, an accumulator 15, a flow rate control valve 16, a flow meter 17, a precooler 18 and a temperature sensor 19 are provided for the gas flow channel 13 in order from the side of the gas cylinder bundle 11. The compressor 14 compresses hydrogen gas from the gas cylinder bundle 11 and then discharges the compressed hydrogen gas. The accumulator 15 accumulates hydrogen gas compressed to a predetermined pressure by the compressor 14. The flow rate control valve 16 regulates the flow rate of hydrogen gas from the accumulator 15. The flow meter 17 measures the flow rate of hydrogen gas. The precooler 18 preliminarily cools hydrogen gas flowing through the gas flow channel 13. The temperature sensor 19 detects the temperature of hydrogen gas at a portion downstream of the precooler 18. In addition, the gas filling device 2 includes a communication instrument 21, a display 22, an outside air temperature sensor 23 and a controller 24. Those devices are electrically connected to the controller 24. Note that, although not shown in the drawing, a cut-off valve for opening the gas flow channel 13 during filling is provided at the accumulator 15 or at a portion downstream of the accumulator 15.

The flow rate control valve 16 is an electrically driven valve, and includes, for example, a step motor as a driving source. The flow rate control valve 16 regulates the flow rate of hydrogen gas in such a manner that the opening degree of the valve is varied by the step motor in accordance with a command from the controller 24. By so doing, the filling flow rate at which hydrogen gas is filled into the gas tank 30 is controlled. The thus controlled filling flow rate is measured by the flow meter 17. Then, the controller 24 controls the flow rate control valve 16 in a feedback manner by receiving the measured filling flow rate so that the filling flow rate coincides with a desired filling flow rate. Note that a flow rate controller other than the flow rate control valve 16 may be used.

The precooler 18 cools hydrogen gas at about room temperature from the accumulator 15 to a predetermined low temperature (for example, −20° C.) by heat exchange. The type of heat exchange of the precooler 18 may be any one of a partition wall type, an intermediate medium type and a storage type, and a known structure may be used for the precooler 18. When giving an example, the precooler 18 has a conduit portion through which hydrogen gas flows, and the conduit portion is accommodated in a casing through which refrigerant flows to thereby perform heat exchange between hydrogen gas and refrigerant. In this case, the cooling temperature for hydrogen gas may be regulated by regulating the amount and temperature of refrigerant supplied to the casing. In this way, the temperature of hydrogen gas cooled by the precooler 18 is detected by the temperature sensor 19, and the detected signal is input to the controller 24.

The communication instrument 21, for example, has a communication interface that carries out wireless communication, such as infrared-ray communication. The display 22 displays various pieces of information, such as information of the filling flow rate during gas filling, on a screen. The display 22 may have an operation panel for selecting or specifying a desired filling amount, or the like, on a display screen.

The controller 24 is configured as a microcomputer that incorporates a CPU, a ROM and a RAM inside. The CPU executes a desired computation in accordance with a control program to carry out various processes and controls. The ROM stores control programs and control data processed in the CPU. The RAM is mainly used as various work areas for control processes. The controller 24 is electrically connected to not only the communication instrument 21, or the like, through control lines indicated by the alternate long and short dashed line in FIG. 2 but also the gas cylinder bundle 11, the compressor 14, the accumulator 15 and the precooler 18. The controller 24 comprehensively controls the whole of the gas filling device 2. In addition, the controller 24 uses the communication instrument 21 to transmit information, which can be acquired by the gas filling device 2, to the vehicle 3.

Figure 7:
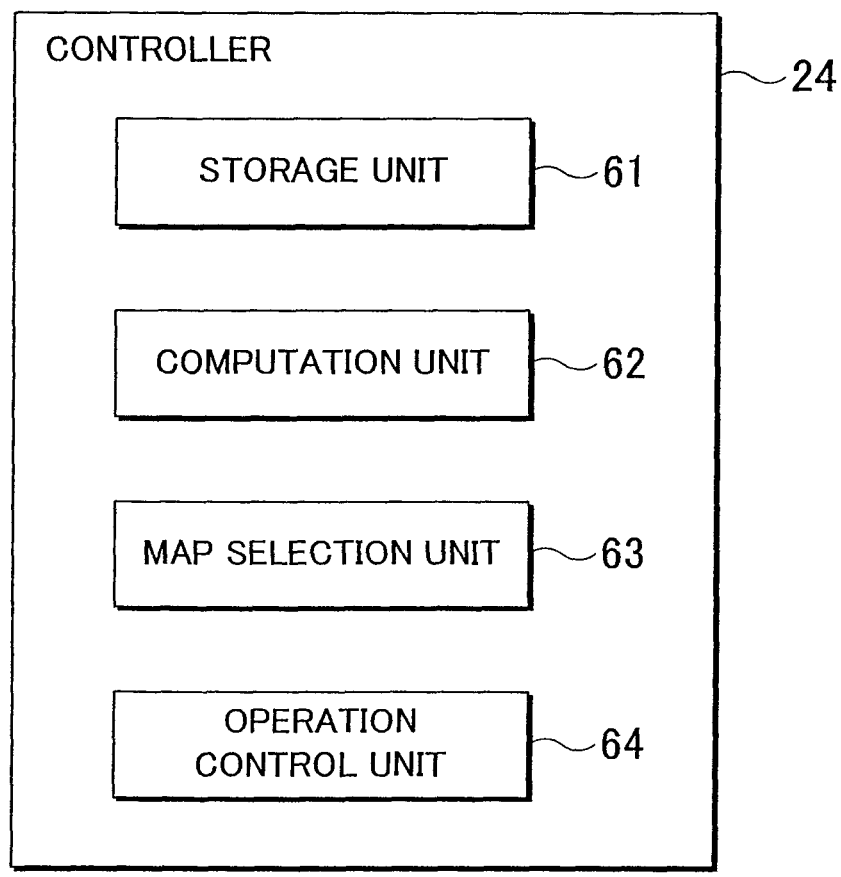
FIG. 7 is a functional block diagram of a controller of a gas filling device according to the embodiment.

As shown in FIG. 7, the controller 24 includes a storage unit 61, a computation unit 62, a map selection unit 63 and an operation control unit 64 as functional blocks for implementing control over a filling rate. The storage unit 61 is formed of the ROM, the RAM, or the like, and, for example, prestores a filling rate map group (a plurality of filling rate maps), which will be described later. The computation unit 62 carries out various computations necessary for control over a filling rate, and, for example, calculates a temperature increase and a pressure increase in hydrogen gas in the gas tank 30. The map selection unit 63 selects a filling rate map on the basis of the result of calculation made by the computation unit 62, as will be described later. The operation control unit 64 loads the filling rate map, selected by the map selection unit 63, from the storage unit 61, and then transmits a control command to various devices on the basis of the loaded filling rate map to thereby control the various devices to fill hydrogen gas.

The vehicle 3 includes the gas tank 30 and the receptacle 32. The gas tank 30 is a fuel gas supply source to a fuel cell, and is a high-pressure tank that is able to store hydrogen gas of, for example, 35 MPa or 70 MPa. When a plurality of the gas tanks 30 are, mounted, the gas tanks 30 are connected in parallel with the fuel cell. Hydrogen gas in the gas tank 30 is supplied to the fuel cell via a supply conduit (not shown). On the other hand, hydrogen gas is supplied from the gas filling device 2 to the gas tank 30 via the receptacle 32 and a filling conduit 34. A check valve 36 for preventing backflow of hydrogen gas is, for example, provided for the filling conduit 34. A temperature sensor 40 and a pressure sensor 42 respectively detect the temperature and pressure of hydrogen gas in the gas tank 30, and may be provided for the supply conduit or the filling conduit 34.

In addition, the vehicle 3 includes a communication instrument 44, a controller 46 and a display 48. The communication instrument 44 transmits or receives various pieces of information to or from the communication instrument 21 of the gas filling device 2. The controller 46 is configured as a microcomputer as well as the controller 24 of the gas filling device 2. The display 48 displays various pieces of information on a screen. The communication instrument 44 is of a type compatible with the communication instrument 21, and, for example, has a communication interface that carries out wireless communication, such as infrared-ray communication. The communication instrument 44 is installed in the receptacle 32 or is fixed to a lid box of the vehicle 3 so as to be able to carry out communication with the communication instrument 21 in a state where the filling nozzle 12 is connected to the receptacle 32. The controller 46 receives the result detected by various sensors, including the temperature sensor 40 and the pressure sensor 42, to comprehensively control the vehicle 3. In addition, the controller 46 uses the communication instrument 44 to transmit information, which can be acquired by the vehicle 3, to the gas filling device 2. The display 48 may be, for example, used as part of a car navigation system.

In the gas filling system 1, when the vehicle 3 is filled with hydrogen gas, first, the filling nozzle 12 is connected to the receptacle 32. In this state, the gas filling device 2 is activated. Then, after hydrogen gas accumulated in the accumulator 15 is cooled by the precooler 18, the hydrogen gas is discharged from the filling nozzle 12 to the gas tank 30. In the gas filling system 1 and the gas filling method according to the present embodiment, the gas filling device 2 determines the heat radiation performance of the gas tank 30 on the basis of information from the vehicle 3 at the initial stage of filling to thereby control the filling rate to a value suitable for the gas tank 30.

Next, control over the filling rate in the gas filling system 1 (gas filling method) will be described with reference to the flowchart shown in FIG. 3.

First, when a gas filling worker connects the filling nozzle 12 to the receptacle 32, and conducts filling start operation that allows discharge of hydrogen gas from the gas filling device 2 to the gas tank 30, pre-filling is started (step S1). By so doing, hydrogen gas cooled by the precooler 18 is discharged to the gas tank 30. As hydrogen gas flows into the gas tank 30, the temperature and pressure of hydrogen gas in the gas tank 30 (hereinafter, referred to as "tank temperature" and "tank pressure") increase.

Pre-filling in step S1 is carried out at a constant filling rate for predetermined t seconds (step S2). It is only necessary that the length of the predetermined t seconds allows acquiring the heat radiation performance of the gas tank 30 from variations in tank temperature and tank pressure caused by filling. Therefore, for example, 60 seconds may be sufficient; however, this may cause a long total period of time for filling. On the other hand, one or two seconds are too short, so there is a possibility that variations in tank temperature and tank pressure cannot be sufficiently detected. In consideration of these points, the length of the predetermined t seconds is desirably determined in consideration of a balance between a total period of time for filling and a time that allows variations in tank temperature and tank pressure to be detected. For example, 30 seconds is desirable. In addition, the constant filling rate in pre-filling is desirably slower than the filling rate in main filling (step S7). Note that the unit of the filling rate is generally expressed using g/min or MPa/min, and MPa/min is used in the description of the present embodiment.

In the next step S3, a tank temperature increase ΔT and a tank pressure increase ΔP that are varied for the predetermined t seconds are calculated. The calculation is carried out in the computation unit 62 of the controller 24 at the side of the gas filling device 2 on the basis of information of the tank temperature and tank pressure acquired at the side of the vehicle 3.

More specifically, the controller 46 at the side of the vehicle 3 receives detected signals of the tank temperature and tank pressure read by the temperature sensor 40 and the pressure sensor 42 immediately after a start of pre-filling (hereinafter, referred to as "tank initial temperature" and "tank initial pressure" where appropriate). In addition, the controller 46 receives detected signals of the tank pressure and tank temperature read the predetermined t seconds later from the start of pre-filling. The controller 46 utilizes the communication instrument 44 to transmit the values of the tank pressure and tank temperature detected at these two timings to the communication instrument 21 of the gas filling device 2. Receiving the result of communication, the controller 24 of the gas filling device 2 calculates a tank temperature increase ΔT and a tank pressure increase ΔP. The tank temperature increase ΔT may be a value that is obtained by subtracting the tank initial temperature from the tank temperature the predetermined t seconds later; instead, a value that is obtained by dividing the tank temperature the predetermined t seconds later by the tank initial temperature (that is, tank temperature increase rate) may be used. This also applies to the tank pressure increase ΔP.

In the next step S4, it is determined whether the ratio of the tank temperature increase ΔT to the tank pressure increase ΔP (hereinafter, referred to as "increase ratio ΔT/ΔP") is larger than or equal to a threshold X. The determination is made by the map selection unit 63 of the controller 24 at the side of the gas filling device 2.

More specifically, the heat radiation performance of the gas tank 30 may be acquired from the value of the increase ratio ΔT/ΔP. A gas tank has different heat radiation performance or a rate of increase in temperature depending on the material, surface area, structure, and the like. For example, heat radiation performance is higher when aluminum is used as a liner of the gas tank 30 than when resin (polyethylene, or the like) is used as the liner. In addition, the heat radiation performance varies depending on the characteristic of resin and/or a mixture ratio in the resin liner. In this way, the heat radiation performance is not always the same in the current or future gas tank 30. Then, in the present embodiment, the heat radiation performance of the gas tank 30 is determined in such a manner that the increase ratio ΔT/ΔP is compared with the threshold X obtained through simulation or evaluation result in advance (step S4).

As a result, when the increase ratio ΔT/ΔP is larger than or equal to the threshold X, it is determined that the heat radiation performance of the gas tank 30 is relatively low, and then the map selection unit 63 of the controller 24 selects a filling rate map Ma (step S4: Yes, step S5). Otherwise, it is determined that the heat radiation performance of the gas tank 30 is relatively high, and then the map selection unit 63 of the controller 24 selects a filling rate map Mb (step S4: No, step S6).

The filling rate maps Ma and Mb are prestored in the storage unit 61 of the controller 24 as part of the filling rate map group. The map selection unit 63 of the controller 24 selects any one of the filling rate maps Ma and Mb from the filling rate map group on the basis of the increase ratio ΔT/ΔP (step S5 or S6). Then, the operation control unit 64 of the controller 24 uses the selected filling rate map to start main filling of hydrogen gas by the gas filling device 2 (step S7).

Figure 6:
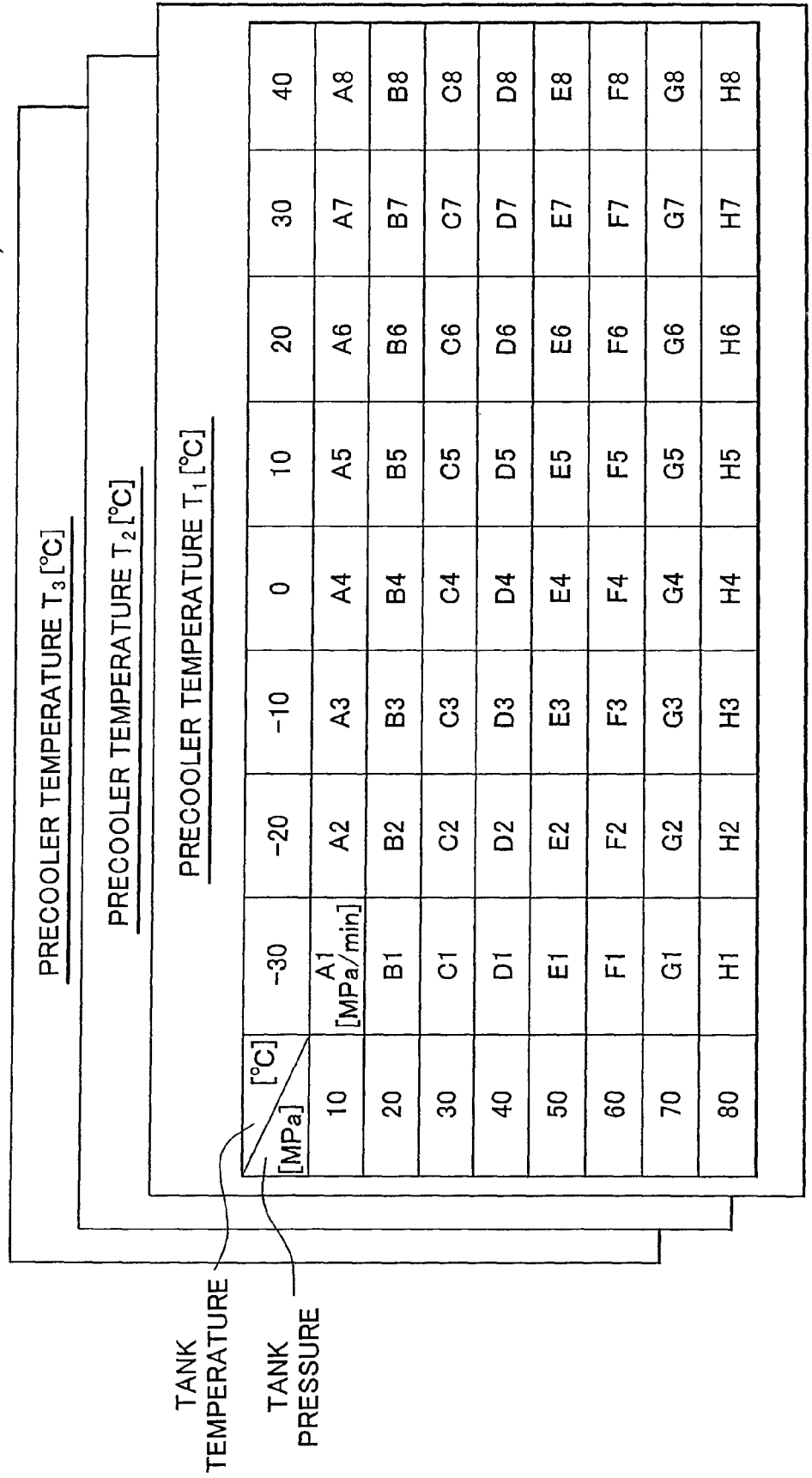
FIG. 6 is a view that shows an example of filling rate maps used for the flow of gas filling according to the first alternative embodiment.

Here, the filling rate map group configures the individual filling rate maps Ma and Mb so that filling is performed at a higher filling rate as the increase ratio ΔT/ΔP decreases (that is, as the heat radiation performance of the gas tank 30 is determined to be higher). An example of the filling rate map group may be, for example, shown in the following Table 1. As in the case of the filling rate map Ma (FIG. 6) as a desirable example, which will be described later, each filling rate map in the filling rate map group is configured to define a plurality of filling rates for at least one condition, such as a tank initial pressure and a tank initial temperature. In Table 1, filling rates α and β that are assigned for the respective filling rate maps Ma and Mb are examples of filling rates when those conditions are the same.

TABLE 1

| Filling Rate Map Group | | |
| --- | --- | --- |
| | Filling Rate Map Ma | Filling Rate Map Mb |
| Filling Rate [MPa/min] | α | β |
| | | * where α < β |

The filling rates α and β mean optimal filling rates at which high-speed filling may be carried out while the tank pressure and tank temperature in the gas tank 30 do not exceed respective reference values (for example, 85° C.). That is, in the case of the filling rate α, a predetermined filling amount (a filling amount in the case of full filling and a filling amount in the case of specified amount filling) may be filled in a short period of time as much as possible while the inside of the gas tank 30 having a relatively low heat radiation performance is kept stable. On the other hand, in the case of the filling rate β, a predetermined filling amount may be filled in a further short period of time while the inside of the gas tank 30 having a relatively high heat radiation performance is kept stable. In one specific example, the gas tank 30 is filled at the filling rate α using the filling rate map Ma when the gas tank 30 is formed of a resin liner, and is filled at the filling rate β using the filling rate map Mb when the gas tank 30 is formed of an aluminum liner. As a result, the gas tank 30 formed of an aluminum liner having a good heat radiation performance may be filled in a further short period of time.

After the start of main filling in step S7, the gas filling device 2 is controlled to attain the filling rate defined in the filling rate map. Specifically, the operation control unit 64 of the controller 24 controls the opening degree of the flow rate control valve 16 so as to attain the determined filling rate while checking the result measured by the flow meter 17.

In addition, during main filling, the fact that gas filling is performed using the filling rate map selected in step S5 or step S6 is indicated on at least one of the display 22 of the gas filling device 2 and the display 48 of the vehicle 3. That is, a gas filling worker can recognize the fact that control is carried out under a situation that the filling rate map is selected on the basis of conditions including the heat radiation performance of the gas tank 30 through indication of at least one of the displays 22 and 48 in the gas filling system 1. After that, as the predetermined filling amount has been filled into the gas tank 30, supply of hydrogen gas from the gas filling device 2 is stopped to complete gas filling. Note that it is also applicable that indication similar to the above is displayed on at least one of the displays 22 and 48 after completion of gas filling as well or only after completion of gas filling.

After completion of gas filling, it is desirable that the storage unit (for example, the storage unit 61 or the RAM) of at least one of the controllers 24 and 46 in the gas filling system 1 temporarily stores a communication history between the communication instrument 44 and the communication instrument 21. The communication instrument 44 and the communication instrument 21 serve as communication devices. The communication history desirably contain, for example, a history indicating that the tank temperature and the tank pressure are transmitted from the communication instrument 21 to the communication instrument 44 at the above two timings during pre-filling. Such a communication history may be stored in both the gas filling device 2 and the vehicle 3, and is desirably stored in the vehicle 3. This is because, at the time of a vehicle inspection, or the like, it is possible to simply determine whether gas filling has been carried out in accordance with the flow shown in FIG. 3.

With the above described present embodiment, it is possible to determine the heat radiation performance of the vehicle-mounted gas tank 30 by the gas filling device 2 and then to carry out filling control over the gas tank 30 using the filling rate map Ma or Mb suitable for the determined heat radiation performance. Therefore, it is possible to carry out gas filling at a filling rate suitable for the heat radiation performance of the gas tank 30, so a period of time for filling may be reduced.

In addition, if a method for calculating only a temperature increase $\Delta T$ is used to determine the heat radiation performance of the gas tank 30, which is different from the present embodiment, the rate of increase in tank temperature varies depending on the size of a tank volume. In terms of this point, similarly, if a method for calculating only a pressure increase $\Delta P$ is used, the rate of increase in tank pressure varies depending on the size of a tank volume. Therefore, it is difficult to appropriately acquire the heat radiation performance. In contrast, according to the present embodiment, because a method for calculating both a temperature increase $\Delta T$ and a pressure increase $\Delta P$ is used, it is possible to appropriately acquire the heat radiation performance without receiving the influence of the volume of the gas tank 30.

Furthermore, because the heat radiation performance of the gas tank 30 may be acquired through calculation, it is not necessary to store the heat radiation performance of each of the individual gas tanks 30 in advance in the gas filling device 2 at the hydrogen station. In addition, it is not necessary to update the software of the filling rate map group for each new vehicle.

In addition, in process of acquiring the heat radiation performance of the gas tank 30 (steps S1 to S3), the filling rate is made constant, so it is possible to simplify the filling rate map group. In addition, when the filling rate lower than the filling rates defined in the filling rate maps Ma and Mb is used as the constant filling rate, it is possible to stably keep the state inside the gas tank 30 even in the process of acquiring the heat radiation performance. Furthermore, the increase ratio $\Delta T/\Delta P$ is used to determine the heat radiation performance (step S4), so it is not necessary to use filling rate maps that individually define predetermined ranges of the temperature increase $\Delta T$ and pressure increase $\Delta P$. Thus, it is possible to simplify individual filling rate maps.

Note that in the above description, two filling rate maps Ma and Mb included in the filling rate map group are shown; however, of course, the number of filling rate maps is not limited to two. When the number of thresholds for comparison with the increase ratio $\Delta T/\Delta P$ is, for example, increased, the number of filling rate maps will be three or more. For example, when two thresholds are used, the filling rate map group shown in the following Table 2 may be used. In this case, in step S4 of FIG. 3, the increase ratio $\Delta T/\Delta P$ is compared with both thresholds X and Y. Any one of the three filling rate maps Ma, Mb and Mc is selected on the basis of the comparison result (similar to steps S5 and S6), and gas filling is carried out at the filling rate defined in the selected filling rate map.

TABLE 2

Filling Rate Map Group

|  | $\Delta T/\Delta P \geq X$ | $Y < \Delta T/\Delta P < X$ | $Y \geq \Delta T/\Delta P$ |
|---|---|---|---|
| Filling Rate Map | Ma | Mb | Mc |
| Filling Rate [MPa/min] | $\alpha$ | $\beta$ <br> * where $\alpha < \beta < \gamma$ <br> and $Y < X$ | $\gamma$ |

Alternative Embodiments

Next, some alternative embodiments to the present embodiment will be described. Note that the alternative embodiments may be applied to the present embodiment alone, and may be applied in combination with another alternative embodiment.

First Alternative Embodiment

Figure 3:
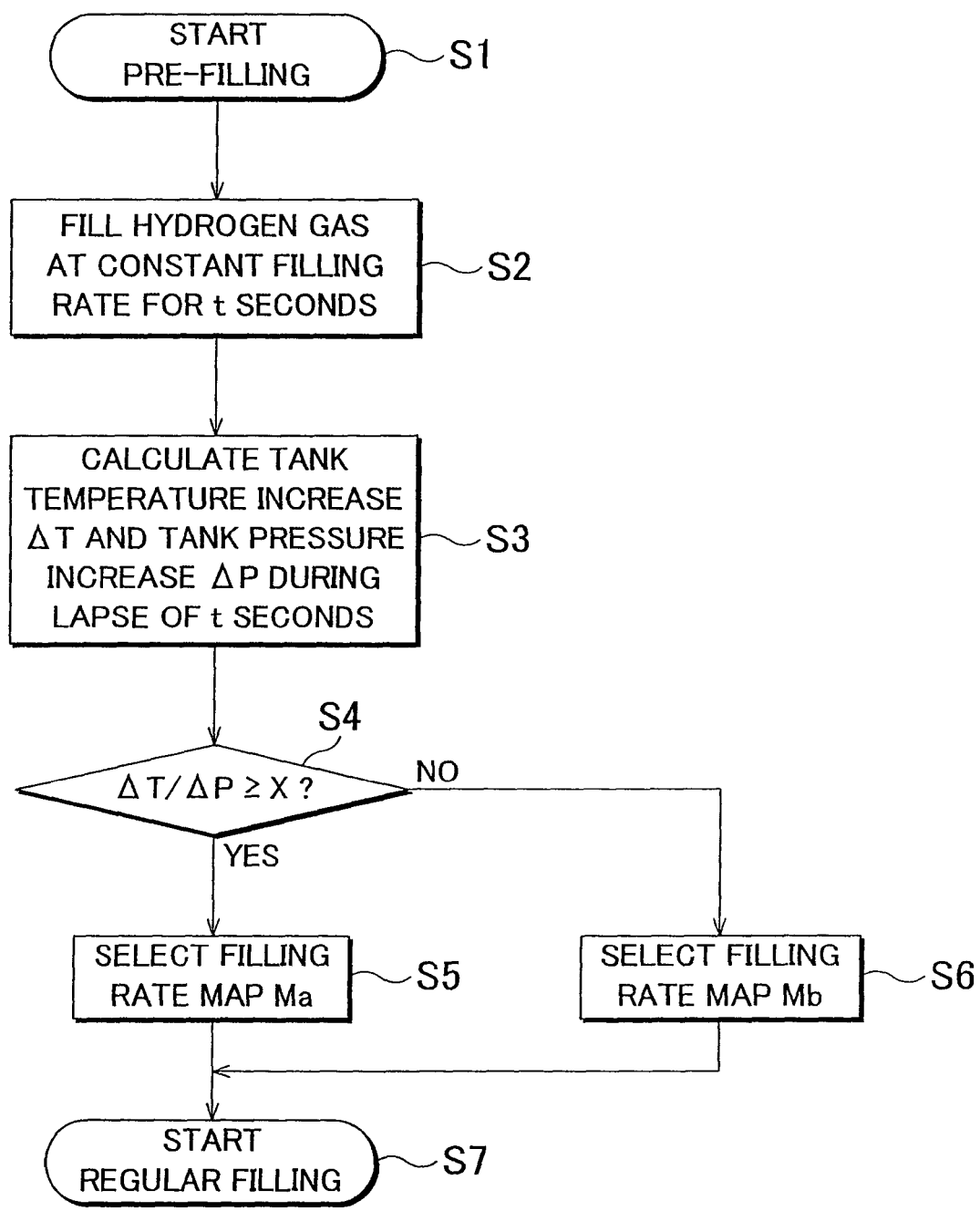
FIG. 3 is a flowchart that shows the flow of gas filling of the gas filling system according to the embodiment.
Figure 4:
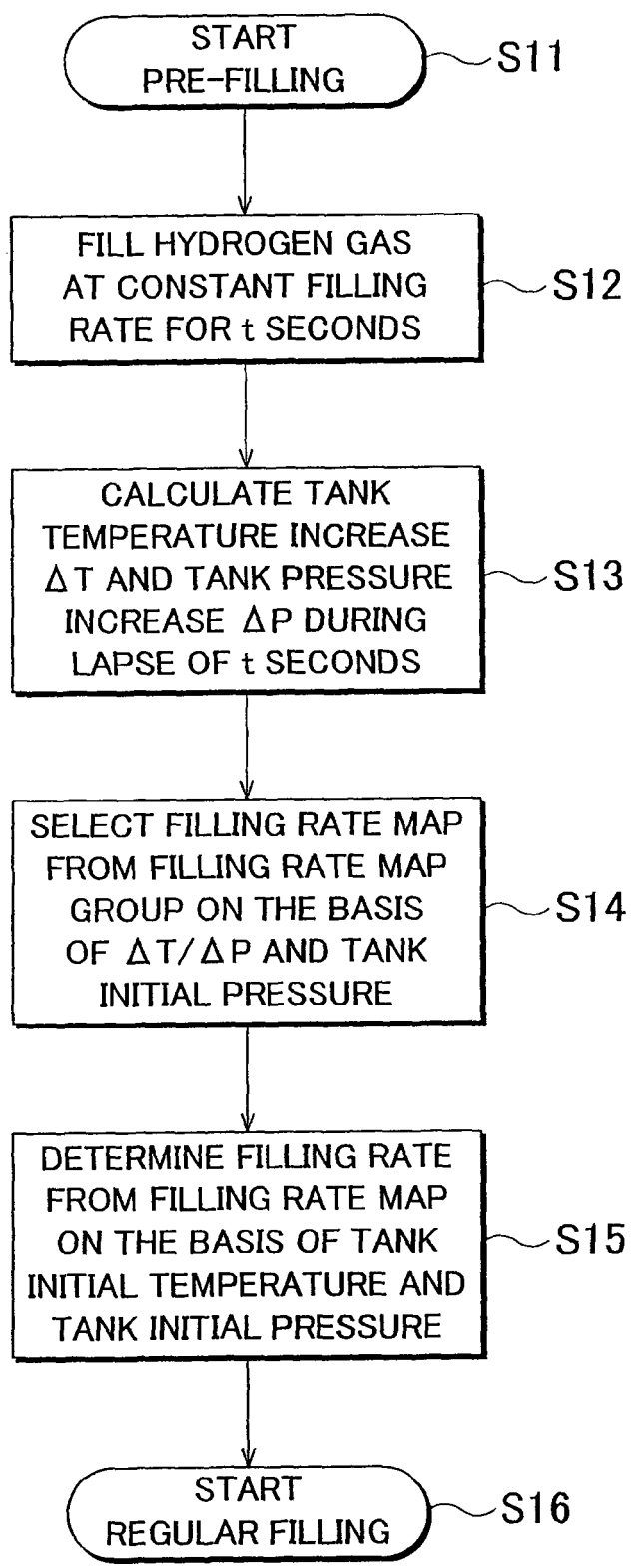
FIG. 4 is a flowchart that shows the flow of gas filling of a gas filling system according to a first alternative embodiment to the embodiment.

As shown in FIG. 4, steps S14 and S15 may be used instead of steps S4 to S6 shown in FIG. 3. Note that steps S11 to S13 and S16 shown in FIG. 4 are the same as steps S1 to S3 and S7 shown in FIG. 3, so the description thereof is omitted.

In step S14, a filling rate map is selected from the filling rate map group on the basis of the increase ratio $\Delta T/\Delta P$ and the tank initial pressure. As shown in FIG. 5 that shows an example of the filling rate map group used in this case, a filling rate map group MM defines a plurality of filling rate maps using the tank initial pressure for the ordinate axis and the increase ratio $\Delta T/\Delta P$ for the abscissa axis. Here, the tank initial pressure and the increase ratio $\Delta T/\Delta P$ are set for each of three ranges to define nine filling rate maps Ma to Mi in total. However, of course, these may be appropriately changed in design. In step S14, for example, when the increase ratio $\Delta T/\Delta P$ is smaller than the threshold A and the tank initial pressure is 10 MPa, the filling rate map Ma is selected.

Note that, as in the case of the above described embodiment, the filling rate map group MM is prestored in the storage unit 61 of the controller 24, and the filling rate map Ma is selected by the map selection unit 63 of the controller 24. In addition, the filling rate map group MM configures individual filling rate maps Ma to Mi so as to carry out gas filling at a higher filling rate as the increase ratio $\Delta T/\Delta P$ decreases. Thus, for example, the filling rate in the filling rate map Mb is lower than that in the filling rate map Ma; however, the filling rate defined in the filling rate map Mb is higher than that in the filling rate map Mc.

In step S15, the controller 24 determines the filling rate on the basis of the tank initial temperature and the tank initial pressure by referring to the filling rate map. This may be carried out by the operation control unit 64 of the controller 24. When an example is described using the filling rate map Ma, the filling rate map Ma shown in FIG. 6 defines a plurality of filling rates using the tank initial pressure for the ordinate axis and the tank initial temperature for the abscissa axis. In addition, the filling rate map Ma is provided for each of a plurality of precooler temperatures (for example, $T_1$, $T_2$ and $T_3$, where $T_1 < T_2 < T_3$). The precooler temperature is the temperature of hydrogen gas in the precooler 18, and is detected by the temperature sensor 19. The controller 24 that directly receives a signal of the detected precooler temperature acquires a precooler temperature immediately after a start of pre-filling or a precooler temperature after a lapse of the predetermined t seconds from the start of pre-filling. In step S15, for example, when the detected precooler temperature is $T_1$, the tank initial pressure is 40 MPa and the tank initial temperature is 0° C., the filling rate is determined to be D4 [MPa/min]. After that, main filling is started at the determined filling rate (step S16).

Here, two points regarding the order of filling rate values in the filling rate map Ma will be described. Firstly, when the tank initial pressure and the tank initial temperature are the same, the value of filling rate decreases as the precooler temperature increases. For example, when the tank initial pressure is 40 MPa and the tank initial temperature is 0° C., the filling rate at the precooler temperature $T_2$ is lower than the filling rate D4 at the precooler temperature $T_1$.

Secondly, when the precooler temperature is the same, the filling rate may be increased as the tank initial pressure increases or as the tank initial temperature decreases. For example, at the precooler temperature $T_1$, among filling rates A1 to H8 in the filling rate map Ma, the filling rate H1 (tank pressure: 80 MPa, tank temperature: −30° C.) is maximal, and the filling rate A8 (tank pressure: 10 MPa, tank temperature: 40° C.) is minimal.

Note that, in the filling rate map Ma, tank pressures are set in steps of 10 MPa and tank temperatures are set in steps of 10° C.; of course, the scales of them may be arbitrarily set. The scale of the precooler temperature may also be arbitrarily set in steps of, for example, 2° C. to 3° C., 5° C. or 10° C. In addition, the filling rate maps Mb to Mi each have a similar configuration to that of the filling rate map Ma, but the filling rate maps Mb to Mi have different filling rates from one another. Similarly, the respective filling rates in the filling rate maps Ma to Mi mean a filling rate at which high-speed filling may be carried out without a situation that the tank pressure and tank temperature in the gas tank 30 exceed respective reference values under respective conditions of the tank initial pressure, tank initial temperature and precooler temperature.

According to the above described first alternative embodiment, in addition to the functions and advantageous effects similar to those of the above embodiment, the following functions and advantageous effects may be obtained. That is, when any one of the filling rate maps Ma to Mi is selected, not only the increase ratio ΔT/ΔP but also the tank initial pressure is considered (step S14), so a filling rate map further suitable for the characteristic of the gas tank 30 may be selected. In addition, when the filling rate is determined from the selected filling rate map, the precooler temperature is considered, so it is possible to carry out optimal gas filling in accordance with the cooling performance of the precooler 18.

Note that, in another embodiment to the present alternative embodiment, it is also applicable that the respective filling rate maps Ma to Mi are not set for each of a plurality of precooler temperatures. Alternatively, it is also applicable that, by using an outside air temperature instead of a precooler temperature, the respective filling rate maps Ma to Mi are set for each of a plurality of outside air temperatures. The outside air temperature may be detected by the outside air temperature sensor 23.

Second Alternative Embodiment

In the gas filling system 1, the step of calculating the tank temperature increase ΔT and the tank pressure increase ΔP (step S3 in FIG. 3, step S13 in FIG. 4) and the step of selecting a filling rate map thereafter (steps S4 to S6 in FIG. 3, steps S14 and S15 in FIG. 4) may be executed by separate controllers. For example, it is applicable that the former calculation step is executed by the controller 46 at the side of the vehicle 3, the calculation result is transmitted to the gas filling device 2 through communication, and then the latter selecting step is executed by the controller 24. In this case, a computation unit corresponding to the above described computation unit 62 is included in the controller 46.

Different from this, it is also applicable that, in the gas filling system 1, the calculation step and the selecting step (steps S3 to S6 in FIG. 3, steps S13 to S15 in FIG. 4) are executed by the controller 46 at the side of the vehicle 3. In this case, the filling rate map selected at the side of the vehicle 3 is transmitted to the gas filling device 2 through communication, and then the controller 24 of the gas filling device 2 uses the filling rate map, transmitted from the side of the vehicle 3, to carry out gas filling. In this case, at least a computation unit and a map selection unit corresponding to the computation unit 62 and the map selection unit 63 are included in the controller 46, and the operation control unit 64 of the controller 24 carries out hydrogen gas filling on the basis of the filling rate map selected by the map selection unit of the controller 46.

In short, it is only necessary that the gas filling system 1 includes a controller that has the storage unit 61, the computation unit 62 and the map selection unit 63, and the controller may be formed of the controller 24 of the gas filling device 2 (the above embodiment) or may be formed of the controller 24 of the gas filling device 2 and the controller 46 at the side of the vehicle 3 (second alternative embodiment).

Third Alternative Embodiment

In a third alternative embodiment, the location of the temperature sensor 19 that detects the precooler temperature may be changed. It is only necessary that the temperature sensor 19 is able to detect the temperature of hydrogen gas between the precooler 18 and a portion upstream of the gas tank 30, so the temperature sensor 19 may be provided for the receptacle 32 or the filling conduit 34 at the side of the vehicle 3 or may detect the temperature of hydrogen gas discharged from the gas filling device 2 toward the gas tank 3. In addition, in another embodiment, the temperature sensor 19 may be provided for the filling nozzle 12 and may detect the temperature of hydrogen gas at the filling nozzle 12.

The gas filling system and gas filling method according to the aspect of the invention may be not only applied to hydrogen gas but also applied to a gas that increases in temperature during filling. In addition, the gas filling system and the gas filling method may be not only applied to a vehicle but also applied to a mobile unit equipped with a gas tank as a gas filling destination from an outside, such as an aircraft, a ship and a robot.

The invention claimed is:

1. A gas filling system, comprising:
a vehicle that includes a gas tank as well as a temperature sensor and a pressure sensor that acquire information about a temperature and a pressure in the gas tank immediately after start of pre-filling as tank initial temperature and tank initial pressure and that acquire information about the temperature and the pressure in the gas tank after a predetermined period of time for pre-filling has elapsed; and
a gas filling device that fills gas into the gas tank;
the gas filling device comprising:
a controller that calculates a temperature increase and a pressure increase in the gas tank during the predetermined period of time for pre-filling that elapses from a start of gas pre-filling based on the tank initial temperature and the tank initial pressure and the acquired tank temperature and tank pressure after the predetermined period of time for pre-filling has elapsed, and that selects a filling rate map from a prepared filling rate map group on the basis of the calculated temperature increase and the calculated pressure increase; and an operation control unit that uses the filling rate map, selected by the controller, to carry out gas main-filling.

2. The gas filling system according to claim 1, wherein the operation control unit carries out gas pre-filling at a constant filling rate until the predetermined period of time elapses from the start of gas pre-filling.

3. The gas filling system according to claim 1, wherein a filling rate of gas pre-filling until the predetermined period of time elapses from the start of gas pre-filling is lower than a filling rate of gas main-filling carried out on the basis of the filling rate map.

4. The gas filling system according to claim 1, wherein the controller selects the filling rate map on the basis of a ratio of the calculated temperature increase to the calculated pressure increase.

5. The gas filling system according to claim 4, wherein the filling rate map group configures individual filling rate maps so that a filling rate increases as the ratio decreases.

6. The gas filling system according to claim 1, wherein the gas filling device has a gas supply source and a cooler that is provided between the gas supply source and the gas tank and that cools gas from the gas supply source, and the controller selects the filling rate map on the basis of a temperature of gas cooled by the cooler.

7. The gas filling system according to claim 1, further comprising:
an outside air temperature sensor, wherein
the controller selects the filling rate map on the basis of an outside air temperature detected by the outside air temperature sensor.

8. The gas filling system according to claim 1, further comprising:
a display that indicates a fact that gas is being filled or has been filled into the gas tank using the filling rate map selected by the controller.

9. The gas filling system according to claim 1, wherein the controller calculates the pressure increase by subtracting a pressure in the gas tank at the start of gas pre-filling from a pressure in the gas tank after a lapse of the predetermined period of time.

10. The gas filling system according to claim 1, wherein the controller calculates the pressure increase by dividing a pressure in the gas tank after a lapse of the predetermined period of time by a pressure in the gas tank at the start of gas pre-filling.

11. The gas filling system according to claim 1, wherein the controller calculates the temperature increase by subtracting a temperature in the gas tank at the start of gas pre-filling from a temperature in the gas tank after a lapse of the predetermined period of time.

12. The gas filling system according to claim 1, wherein the controller calculates the temperature increase by dividing a temperature in the gas tank after a lapse of the predetermined period of time by a temperature in the gas tank at the start of gas pre-filling.

13. The gas filling system according to claim 1, further comprising:
a communication device that transmits information about a temperature and a pressure in the gas tank, acquired at a side of the vehicle, to the controller at a side of the gas filling device through communication.

14. The gas filling system according to claim 13, wherein the display is provided for at least one of the vehicle and the gas filling device.

15. The gas filling system according to claim 13, further comprising:
a storage device that stores a history of communication carried out by the communication device.

16. The gas filling system according to claim 13, wherein the communication device includes a first communication instrument that is provided for the vehicle and that transmits the acquired information and a second communication instrument that is provided for the gas filling device and that receives the information from the first communication instrument.

17. The gas filling system according to claim 16, wherein the storage device is mounted on the vehicle.

18. A gas filling method for filling gas from a gas filling device into a gas tank provided at a vehicle, the method comprising:
starting gas pre-filling by the gas filling device for a predetermined period of time;
acquiring information about a temperature and a pressure in the gas tank immediately after start of pre-filling as tank initial temperature and tank initial pressure;
acquiring information about a temperature and a pressure in the gas tank after a predetermined period of time for pre-filling has elapsed;
calculating a temperature increase and a pressure increase in the gas tank during the predetermined period of time for pre-filling that elapses from the start of gas pre-filling based on the tank initial temperature and the tank initial pressure and the acquired tank temperature and tank pressure after the predetermined period of time for pre-filling has elapsed;
selecting a filling rate map from a prepared filling rate map group on the basis of the calculated temperature increase and the calculated pressure increase, and
carrying out gas main-filling by the gas filling device using the selected filling rate map.

19. A gas filling device that fills gas into a gas tank provided at a vehicle, the device comprising:
a temperature sensor and a pressure sensor) that acquire a temperature and a pressure in the gas tank immediately after start of pre-filling as tank initial temperature and tank initial pressure and that acquire information about the temperature and the pressure in the gas tank after a predetermined period of time for pre-filling has elapsed;
a controller that calculates a temperature increase and a pressure increase in the gas tank during the predetermined period of time for pre-filling that elapses from a start of pre-filling gas into the gas tank based on the tank initial temperature and the tank initial pressure and the acquired tank temperature and tank pressure after the predetermined period of time for pre-filling has elapsed, and that selects a filling rate map from a prepared filling rate map group on the basis of the calculated temperature increase and the calculated pressure increase; and
an operation control unit that carries out gas main-filling using the filling rate map selected by the controller.

20. The gas filling system according to claim 10, further comprising:
a storage device that stores a history of communication carried out by the communication device.

21. The gas filling system according to claim 11, further comprising:

a storage device that stores a history of communication carried out by the communication device.

22. The gas filling system according to claim 12, further comprising:
a storage device that stores a history of communication carried out by the communication device.

23. The gas filling system according to claim 13, further comprising:
a storage device that stores a history of communication carried out by the communication device.

* * * * *